United States Patent [19]
Weaver

[11] Patent Number: 5,765,656
[45] Date of Patent: Jun. 16, 1998

[54] HYBRID ELECTRIC MOTOR VEHICLE DRIVE

[76] Inventor: Winstead B. Weaver, 8215 Sunland Blvd., Sun Valley, Calif. 91352

[21] Appl. No.: 587,914

[22] Filed: Jan. 18, 1996

[51] Int. Cl.$^6$ ............................................. B60L 11/00
[52] U.S. Cl. ............................ 180/65.3; 320/61; 290/52
[58] Field of Search ............................ 180/165, 65.1, 180/65.2, 65.3, 65.4; 290/13, 35, 51, 52, 14, 16, 17; 203/61

[56] References Cited

U.S. PATENT DOCUMENTS

| | | | |
|---|---|---|---|
| 3,771,916 | 11/1973 | Flanigan et al. | |
| 3,813,557 | 5/1974 | Traeger | 290/17 |
| 4,119,881 | 10/1978 | Gocho | 290/13 |
| 4,199,037 | 4/1980 | White | 180/65.4 |
| 4,211,930 | 7/1980 | Fengler | 290/15 |

*Primary Examiner*—Richard M. Camby
*Attorney, Agent, or Firm*—Albert O. Cota

[57] ABSTRACT

A hybrid electric motor vehicle drive charged by a gas turbine which has an electric motor (20) driving a set of wheels (22) through a transmission (24). A number, preferably two, battery banks (28 and 30) supply power to the motor. A switchover control (30) selects one bank to operate the motor while leaving the other at rest. A sequence control (34) permits charging of individual batteries of the at rest battery bank with duration and sequence modulation from a gas turbine driven alternator (44), a motor driven alternator (52) and/or an AC/DO battery charger (54). The sequence controller senses time, or in other embodiments, voltage, amperage or distance to switchover the charging from one bank to the other. Hydrogen gas is preferred as a fuel source for the gas turbine to drive the alternator for onboard charging of the batteries.

17 Claims, 3 Drawing Sheets

HYBRID ELECTRIC MOTOR VEHICLE DRIVE

TECHNICAL FIELD

The present invention relates to hybrid electric vehicle drives in general. More specifically to a multiple battery powered motor driven vehicle that incorporates a gas turbine and motor driven alternator which both supply power to charge the batteries.

BACKGROUND ART

Previously, many types of hybrid electric drives have been used in endeavoring to provide an effective means for producing a zero or low emission electric driven motor vehicle. Considerable effort has been expended in this endeavor as some state governments have imposed mandatory prerequisites for at least some vehicles sold in the future to have zero smog emissions. For example, the state of California will require that two percent of the vehicles sold by 1998 have zero emissions, and ten percent by 2003.

Much of the prior art has been directed to all electric drive vehicles, where batteries become the limiting feature, particularly in mileage prior to recharging. Some hybrid vehicles have already been developed, which using the most general sense of the term, those vehicles having more than one prime mover. These hybrid drives usually include the combination of an electrically driven motor and an internal combustion engine either directly driving the wheels or producing battery charging power through a generator or alternator.

While development has been active in hybrid vehicle drives, the internal combustion engine in order to meet zero emission standards, must of necessity use a so called "clean fuel". However, many prior inventions have not taken this problem into consideration or have left that part of the overall development progress to others.

Further, the Use of hydrogen for driving engines has apparently not been vigorously pursued to any large extent although the element in its gaseous state is a clean burning fuel and acceptable with proper precautions for use in motor vehicles.

A search of the prior art did not disclose any patents that read directly on the claims of the instant invention, however the following U.S. patents are considered related:

| U.S. PAT. NO. | INVENTOR | ISSUED |
| --- | --- | --- |
| 5,346,031 | Gardner | 13 September 1994 |
| 5,343,970 | Severinsky | 6 September 1994 |
| 5,331,806 | Warkentin | 26 July 1994 |
| 5,301,764 | Gardner | 12 April 1994 |
| 5,193,634 | Masut | 16 March 1993 |
| 4,588,040 | Albright Jr. et al | 13 May 1986 |
| 3,888,325 | Reinbeck | 10 June 1975 |

Gardner in U.S. Pat. No. 5,346,031 teaches a hybrid motor vehicle propulsion system using an internal combustion engine to cruise and an electric motor for acceleration with clutches to disengage each drive and an electric generator driven from the engine to charge the batteries.

U.S. Pat. No. 5,343,970 issued to Severinsky discloses a hybrid electric vehicle including an internal combustion engine and an electric motor both driving the vehicle with a common shaft. The motor is used for acceleration and hills and the engine for cruising. The motor operates as a generator to charge batteries and regenerative braking. No transmission is used in the drive train.

U.S. Pat. No. 5,331,806 of Warkentin is for a hydrogen fueled gas turbine engine. A compressor provides steam as a working fluid and hydrogen gas is used for combustion. Oxygen is supplied to oxidize the hydrogen fuel with an igniter to fire the mixture.

Gardner in U.S. Pat. No. 5,301,764 teaches a hybrid motor vehicle having an electric motor and utilizing an internal combustion engine for fast charge during cruise mode off condition similar to U.S. Pat. No. 5,346,031 previously described.

U.S. Pat. No. 5,193,634 of Masut discloses hybrid propulsion for vehicles having an internal combustion engine driving at least one wheel through a transmission and clutch. An electric motor is connected to the wheel through a second clutch positioned downstream in the drive train. An alternator driven by the engine charges the battery.

Albright Jr., et al in U.S. Pat. No. 4,588,040 teaches a triple system using an internal combustion engine, electric motor and a flywheel. The engine charges the batteries to drive the motor and the flywheel is used to apply periodic power through a planetary gear set. A drive transmission applies regenerative braking energy back through the planetary gear set to recharge both the flywheel and the batteries.

U.S. Pat. No. 3,888,325 issued to Reinbeck discloses a dynamo that is connected over a claw clutch to the driving wheels of a vehicle. An internal combustion engine is connected over a slip clutch to the shaft of the dynamo electric machine. Simultaneous re-charging of a battery is achieved when only the engine is in operation.

It should be noted that recharging batteries by an engine appears to be in common usage however, the use of a single direct electric drive with an engine powering only a generator or alternator for re-charging batteries appears to be lacking in the prior art discovered.

DISCLOSURE OF THE INVENTION

As previously discussed, the need for a practical zero-emissions vehicle has been with us for quite sometime. However, its development has become increasingly important as government mandated requirements draw nearer. The inventive hybrid electrical motor vehicle, in its most basic form consists of:

a) an electric motor driving a set of wheels through mechanical means for propulsion of the vehicle, b) a set of batteries contained within the vehicle and connected to power the electric motor, c) a gas turbine operated by a gaseous fuel that preferably consists of hydrogen gas, and d) an alternator that is driven by the gas turbine and that maintains said batteries in a charged condition.

In view of the above, it is the primary object of the invention to have a vehicle drive that employs an all-electric system that is flexible enough to utilize stationary commercial power as well as on board engine driven generating equipment and regenerative braking power to recharge the self contained electrical storage batteries. Particularly when the invention utilizes hydrogen gas or some other non polluting gaseous fuel as its primary energy source.

Previously, the weight of the required stored batteries in conjunction with an internal combustion engine, has been a deterrent in the successful development of such a vehicle drive. The overall weight of a vehicle requires a specific amount of horsepower to provide acceptable acceleration levels and incline speed capabilities. An internal combustion engine is inherently heavy by nature and the addition of a traction motor and stored batteries create insurmountable problems of weight versus horsepower in an hybrid electric vehicle. The present invention easily overcomes this difficulty by using a gas turbine engine directly coupled to an electric alternator. As the speeds of a gas turbine are relatively high, 90,000 to 100,000 RPM, the equivalent power obtained from a very small lightweight package is an insignificant percentage of the weight of a conventional internal combustion engine of the same horsepower. Further, an alternator turning at these high speeds creates high frequency electrical power that is easily rectified to direct current, again at a weight advantage of a fraction of that of a slow speed generator.

This combination makes the invention realistic therefore becoming an important object in furthering of the state of the art in this field of endeavor.

Another object of the invention is directed to the actual charging of the batteries. Prior art has simply connected a bank of batteries in series to obtain the optimum voltage for the traction motor and charged them externally. The problem with this battery charging method is that all the batteries are being fed from either end of the battery bank. Because a large amount of resistance is created by each battery within the bank, the center batteries in the bank do not receive a full charge. Additionally, the end batteries are usually overcharged thus, reducing their useful life. The instant invention solves this difficulty by sequentially charging the batteries for a predetermined length of time and succession such that the outside batteries and the inside batteries see the charge intermittently. Thus, distributing the frequency and length of charge throughout the entire bank.

Further, while the invention prefers to use a bank of sealed batteries of the gel electrolyte read-acid type any type of battery may be used with equal ease as the sequential charging system is applicable to almost all rechargeable batteries in present use.

Still another object of the invention is its ability to be charged from an external source using an onboard AC/DC battery charger. This external Power may be obtained at the users home base or utilities supply for charger connection to the domestic power grid. The invention includes but is not limited to an industry standardized receptacle for 120 volt 60 hertz single phase 20 amp power which will be compatible with the government proposed vehicle charging sites. It should be noted however, that all electric drive vehicles using batteries as the sole power source presently have a range of 100 to 150 miles whereas the instant invention will have unlimited battery mileage restricted only by the onboard fuel supply.

An optional object of the invention is the regenerative braking and decelerating feature integral with the drive. An alternator is driven by the electric motor and supplies power to charge the battery when the brake or clutch is applied. The residual kinetic energy of the mass is utilized while braking or shifting gears by generating electricity and charging the batteries. Further this alternator is mechanically attached to the drive motor and has the capability of charging the batteries any time charging is required. This is controlled by a inherent regulator that restricts the electrical flow to only times of need so as not to overfeed the batteries or consume unnecessary energy.

It may also be noted that the resistance produced during times when the vehicle slows down will actually assist in vehicle braking, also this resistance prevents over-reving of the motor when the load is removed during gear shifting if applicable.

A further object of the invention is the use of a exhaust gas heater for the vehicles interior. As the gas turbine engine emits a heated exhaust, an air to air heat exchanger is employed that transfers this waste heat to ambient air from a fresh air intake and one to the veihicle's air distribution system at controlled volumes. The heater operates only upon demand creating effectual vehicle heating as required.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment and a second embodiment.

Figure 1:
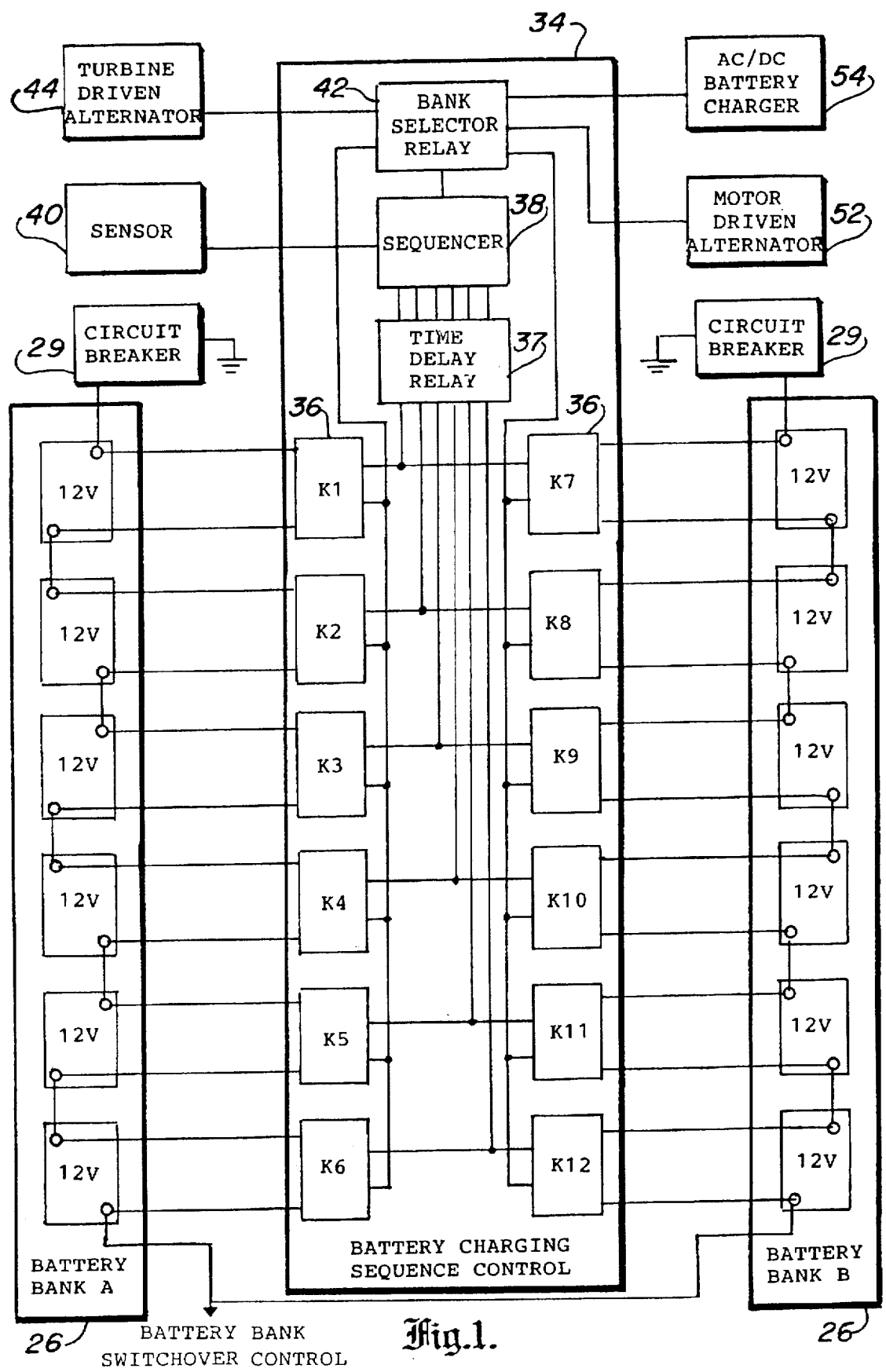
FIG. 1 is a block diagram of the entire vehicle drive system with functional connections illustrated by connecting lines.
Figure 2:
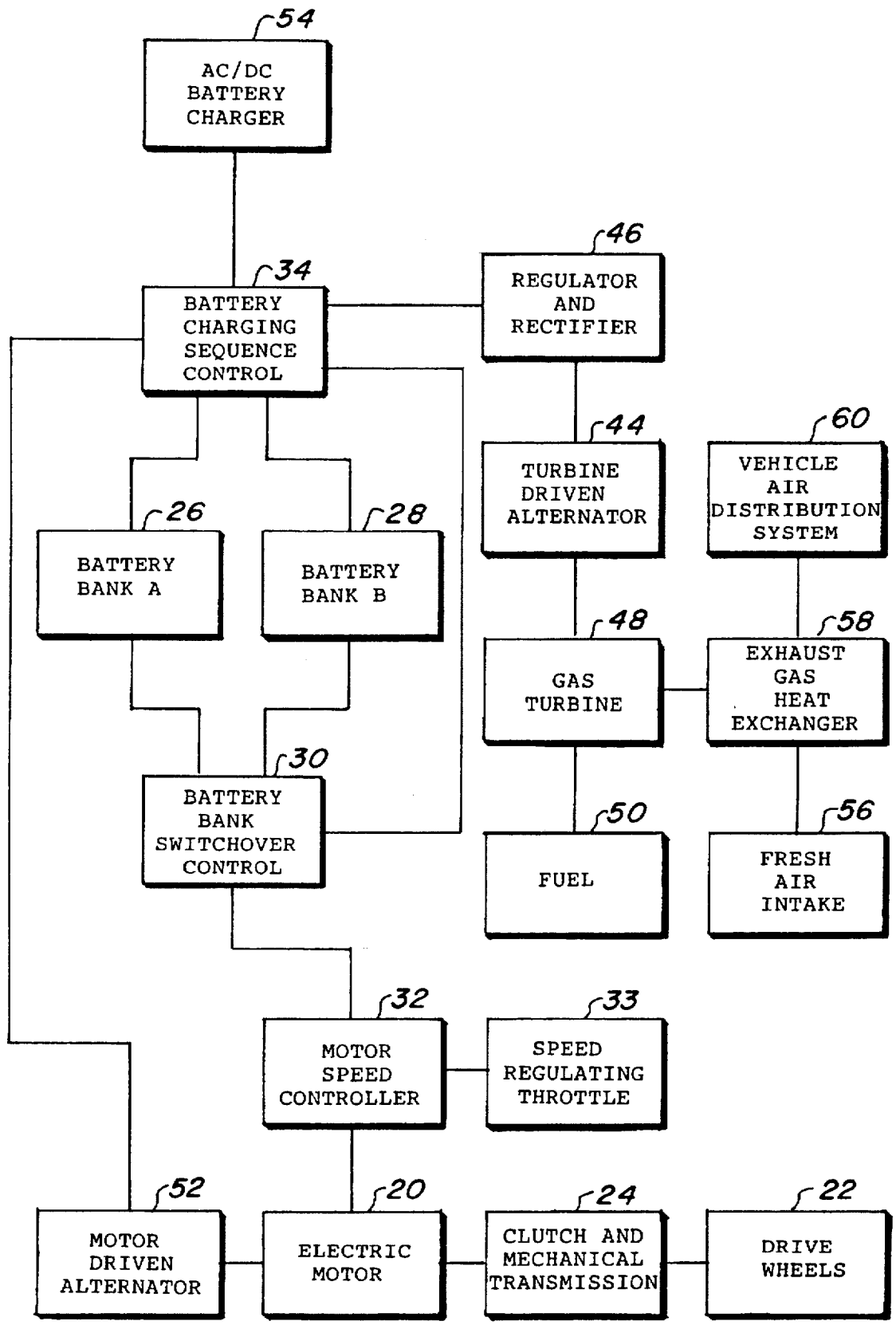
FIG. 2 is a partial block diagram of the battery charging sequence control battery banks and associated charging sources having the interconnection within individual elements shown schematically.

The preferred embodiment, as shown in FIGS. 1 and 2 is comprised of a direct current electric motor 20, preferably having a double ended shaft. The motor horsepower may vary in accordance with the size and weight of the vehicle being driven. Likewise, the power to the motor may vary between 0 and 150 volts d-c with 72 volts being utilized for the preferred embodiment. The motor 20 may be of any type suitable for the application such as open type, totally enclosed fan cooled, carbon brushed, or brushless etc.

One end of the motor shaft is directly connected by mechanical means to rotate a set of drive wheels 22 integral with the vehicle. The mechanical means include a clutch and mechanical transmission 24 intersected between the motor 20 and the wheels 22. The mechanical means may also consist of a torque converter-hydraulic automatic shift transmission. Both the clutch and transmission 24 and the torque converter-hydraulic automatic shift transmission are well known in the art and have been in popular use with internal combustion engine driven vehicles for decades. Obviously, the purpose of their use is to permit manual or automatic adjustment of the speed ratio from the motor 20 to the wheels 22 in a conventional manner.

Electrical energy supplied to the motor is provided by a number of series connected batteries designated as battery bank A, 26, and battery bank B, 28, in FIGS. 1 and 2. The battery banks 26 and 28 are contained within the vehicle and are ultimately connected to the electric motor by electrical wiring. All banks consists of a number of individual batteries each having a given potential, for example the preferred embodiment utilizes size individual batteries of 12 volts each connected in series and protected by circuit breakers 29 to achieve the desired 72 volts d-c, to operate the motor 20 as shown in FIG. 2. While this number of individual batteries are described and two banks are shown, the invention is not limited to this number of batteries or even banks or the orientation illustrated as any combination will function equally well provided the final voltage equals the requirements of the motor 20.

Storage battery development is continually progressing and new approaches are being introduced into the marketplace therefore, the invention is not limited in any way to the type of battery utilized in each individual bank. At the present time however, a sealed, gel electrolyte, lead-acid type such as produced by Spiracell Technology of Denver, Colo. under their registered tradename OPTIMA is preferred. There are however, acceptable alternates such as various conventional lead-acid types, nickel cadmium type, fibre ni-cad type and nickel metal hybrid type and a myriad of others which are all equally suitable for the application.

A battery bank switchover control 30 is in electrical communication with the battery banks 26 and 28 and selects only one battery bank to supply power to the motor 20 permitting the remaining bank to be at rest. This switchover control 30 preferably consists of one electromechanical relay that is electrically interlocked so that only one power source feeds the electric motor 20.

A motor speed controller 32 is electrically connected between the switchover control 30 and the electric motor 20. This controller 32 includes a remote foot controlled speed regulating throttle 33, preferably a variable resistor, that permits the vehicle operator to control the motor speed by varying the input voltage. The actual speed of the motor is controlled by the characteristics of the motor and is therefore governed by specific limits.

A battery charging sequence control 34 is electrically connected to both of the battery banks 36 and 28 however, it only charges one bank at a time. The sequence control is interconnected, or electrically linked, to the switchover control 30 such that only the at rest bank is charged while the other is supplying power to the motor 20. The sequence control 34 supplies a charge to individual batteries at a specific time duration and at a predetermined sequence, prolonging individual battery life. Individual batteries make up the banks that are connected in series permitting individual batteries to be charged independently. FIG. 2 typically illustrates the banks 26 and 28 consisting of six, 12-volt batteries each separately associated with the sequence control 34 and yet unaffected by the series connection.

The battery charging sequence control 34 may be in various forms and still produce the same end results. The preferred embodiment is illustrated in FIG. 2 and consists of a plurality of electromechanical relays 36 designated K1 through K12. Each relay 36 is connected directly to one of the 12-volt batteries making up the two banks. A sequencer 38 energizes the control coil of the relays 36 in a specific order and time duration and an integral time delay relay 37 permits relay closure without overlap. A sensor 40 in the preferred embodiment is a timer integral with the sequence 38 however, in other embodiments it may be an actual remote device that senses voltage, current, or distance of travel. Any of the above are capable of furnishing a signal to activate the sequencer and select the bank to be charged.

A bank selecting relay 42 or relays connect the power from the charging source to the individual relays 36 in the separate banks and are controlled by the sequencer 33. Two separate relays may be employed or alternatively, a double pole, double-throw relay.

In the preferred embodiment a timer is utilized to send a pulse to an integral rotary switch ratchet mechanism which advances a rotary switch one position, sending power to the individual relays 36 in consecutive order and time duration. When the rotary switch has completed one rotation, a second switch wafer contact energizes the bank selector relays 42 switching over from one bank to the other. The sensor 40 in this embodiment is therefore the timer itself, which uses time for both switching over the charged and at-rest banks, as well as, the charging duration for each cell. It should be noted that the charge time may also be set by simple mechanical adjustment according to a predetermined charge rate, for example: 10 seconds per battery at 50 amps or 100 seconds per battery at 10 amps etc.

Other designs of the sequence control 34 include the use of solid state silicon controlled rectifiers (SCRs) in place of the relays 36 and 42 and a programmable microprocessor as the sequencer 38. The sensor 40 may be a voltage or current transducer that produces a digital or an analog signal or a revolution counter that determines distance.

An onboard gas turbine driven alternator 44 is electrically connected to the sequence control 34 as one of the power sources for producing electrical energy to charge the at-rest battery bank. The alternator 44 includes a regulator and rectifier 46 as it rotates at relatively high speeds producing a high frequency alternating current. The alternating current is rectified to direct current with the same results when the turbine includes a geared speed reducer.

The gas turbine 48 is preferably fueled by hydrogen gas using a spark plug for ignition. The preferred embodiment using hydrogen as a fuel 50 includes a flat fuel storage tank that is mounted on the roof of the vehicle with hydrogen gas detectors located in potential collection areas within the vehicle for safety. The fuel tank (not illustrated) consists of a 3,000 to 20,000 PSI pressure vessel constructed of a non-exotic material such as stainless steel or aluminum or an exotic material such as titanium or carbon 60. In either case, the vessel includes a built in regulator to reduce the pressure to 75 or 80 PSI for introduction to the turbine. The vessel is double walled with 100 PSI of $CO_2$ between the walls and hydrogen leak detectors inside the barrier for safety. A high impact valve closes the outlet when the vehicle air bag is deployed, or when the hydrogen flow rate exceeds a preset limit.

Other fuels 50 may be used with equal ease and dispatch such as fossil fuel including but not limited to gasoline, menthol, diesel, in all its grades, jet fuel etc. other gaseous fuels may also be used including but again not limited to butane, propane, natural gas etc.

Another power source for charging the on board batteries is a motor driven alternator 52 complete with regulator that is belt driven from an opposed shaft on the electric motor 20. This alternator 52 continually revolves any time the motor rotates and produces an electrical current to augment battery charging, and when the vehicle brake and clutch are depressed. The built in regulator permits power to be drawn for the batteries only as needed thus eliminating unnecessary power reduction from the motor 20.

A final power source is an alternating current to direct current battery charger 54 that is in direct communication with the sequence control 34. This battery charger 54 may be located on board the vehicle or external to the vehicle. In either case, the charger 54 utilizes conventional utility power outlets or future government furnished battery charging stations. The charger 54 is well known in the art and is sized to match the requirements of the battery banks 26 and 28.

All three charging sources 44,52 and 54 are connected in parallel within the sequence control 34 and may operate singly or in combination.

As an accessory to the vehicle, a heater may be included utilizing a fresh air intake 56, an exhaust gas to fresh air heat exchanger 58 and or vehicle heater air distribution system 60. Fresh air enters the intake 56 and is directed through the heat exchanger 58 where heat is extracted from the exhaust of the gas turbine 48 and introduced into vehicles interior through the distribution system 60 where it is regulated in volume. Grills, blowers, dampers, etc. may also be used for regulation.

Figure 4:
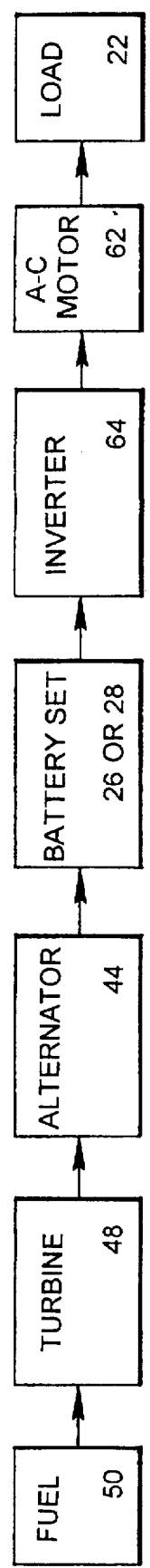
FIG. 4 is a simplified block diagram of the second embodiment of the invention that employs an a-c motor that is powered by an inverter.
Figure 3:
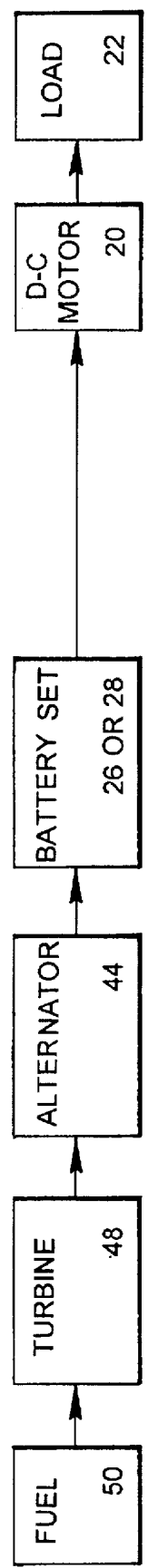
FIG. 3 is a simplified block diagram of the preferred embodiment of the invention that employs a d-c motor that is directly powered by the batteries.

The preferred embodiment of the hybrid electric motor vehicle is shown in a simplified block diagram in FIG. 3. The second embodiment as shown in FIG. 4 differs from the first embodiment in that an a-c electric motor 62 is used. The motor 62 is applied power from an inverter 64 that in turn is powered by the batteries 26 or 28. The remainder of the circuit is identical to the preferred embodiment.

While the invention has been described in complete detail and pictorially shown in the accompanying drawings, it is not to be limited to such details since many changes and modifications may be made in the invention without departing from the spirit and scope thereof. For example, the invention can be equipped with instrumentation that indicates various engine and electrical power parameters such as battery charge rate, motor ampere usage, condition of batteries etc. Also, a manual override can be provided that allows either battery bank A or B to be manually selected or individual batteries charged. Hence, it is described to cover any and all modifications and forms which may come within the language and scope of the appended claims.

I claim:

1. A hybrid electric motor vehicle drive charged by a gas turbine alternator comprising:
   a) an electric motor driving a set of wheels through mechanical means for electromotive propulsion of said vehicle,
   b) a plurality of series connected electric battery banks, contained within said vehicle, connected to the electric motor suppling electrical power for energizing said motor,
   c) a battery bank switchover control associated electrically with the battery banks for selecting at least one battery bank to supply power to said motor, permitting all remaining banks to remain at rest,
   d) a battery charging sequence control linked to the switchover control permitting selective charging of at least one remaining at rest bank With sequence and duration modulation of selected batteries in the battery bank, for prolonging battery life by varying input charge location relative to its series connection and battery condition,
   e) a gas turbine driven alternator electrically connected to the sequence control for producing power to charge at rest battery banks, and
   f) a motor driven alternator and regulator electrically connected through the battery charging sequence control to augment battery charging.

2. The motor vehicle drive as specified in claim 1 further comprising a clutch and mechanical transmission intersected between the electric motor and vehicle wheels permitting a manually adjustable speed ratio.

3. The motor vehicle drive as specified in claims 1 further comprising an automatic transmission intersected between the electric motor and vehicle wheels permitting a manually adjustable speed ratio.

4. The motor vehicle drive as specified in claim 1 wherein said battery banks further comprises a sealed gel electrolyte lead-acid type.

5. The motor vehicle drive as specified in claim 1 wherein said battery banks further comprises a lead acid type.

6. The motor vehicle drive as specified in claim 1 wherein said battery bank switchover control further comprises a plurality of electromechanical relays directed by the battery charging sequence control energizing appropriate relays to change over from one bank to another for motor operation from a charged battery bank.

7. The motor vehicle drive as specified in claim 1 further comprising a motor speed controller electrically connected between the switchover control and the motor reducing the voltage from a selected battery bank to govern speed of the motor within specific limits.

8. The motor vehicle drive as specified in claim 1 wherein said battery charging sequence control further comprises a plurality of electromechanical relays, a sequencer and a time delay relay, with the relays controlled in sequence and time duration by the sequencer and the time delay relay permitting sufficient time lapse for relay closure without overlap.

9. The motor vehicle drive as specified in claim 1 wherein said battery charging sequence control further comprises a plurality of solid state silicon controlled rectifiers and a microprocessor programmable for time sequence and duration.

10. The motor vehicle drive as specified in claim 1 further comprising hydrogen gas as fuel for the turbine.

11. The motor vehicle drive as specified in claim 1 further comprising fossil fuel for turbine operation.

12. The motor vehicle drive as specified in claim 1 further comprising a drive means connecting the motor driven alternator to the electric motor continually revolving the alternator any time the motor is rotating.

13. The motor vehicle drive as specified in claim 1 further comprising an alternating current to direct current battery charger in communication with the battery charging sequence control for charging the battery banks from an external power source.

14. The motor vehicle drive as specified in claim 1 further comprising a vehicle heater having a fresh air intake, an exhaust gas to fresh air heat exchanger and a vehicle heater air distribution system, with fresh air heated by exchanger with the turbine exhaust gas and introduction into a vehicle interior.

15. A hybrid electric motor vehicle drive charged by a gas turbine engine and motor driven alternator of a type having a direct current or alternating current motor driving a set of wheels and a plurality of electric battery banks with switchover control, wherein the improvement comprises a battery charging sequence control linked with the switchover control selectively charging at least one battery bank at one time having a plurality of electromechanical relays, a sequencer and a time delay relay with the relays controlled in sequence and time duration by the sequencer and a time delay relay permitting sufficient time lapse for relay closure without overlap, such that varying input charge location relative to its overall series bank connection along with sequence and time modulation of charging selected batteries in each battery bank to prolong individual battery life.

16. A hybrid electric motor vehicle drive charged by a gas turbine alternator comprising:
   a) an electric motor driving a set of wheels through mechanical means for electromotive propulsion of a vehicle,
   b) a plurality of series connected electric battery banks, contained within a vehicle, connected to the electric motor suppling electrical power for energizing the motor, c) a battery bank switchover control associated electrically with the battery banks for selecting at least one battery bank to supply power to the motor, permitting all remaining banks to be at rest, d) a battery charging sequence control linked to the switchover control permitting selective charging of at least one remaining at rest bank with sequence and duration modulation of selected batteries in the battery bank, for prolonging individual battery life by varying input charge location relative to its series connection, e) a hydrogen gas turbine driven alternator electrically connected to the sequence control for producing power to charge at rest battery banks, and f) a motor driven alternator and regulator electrically connected through the battery charging sequence control to augment battery charging.

17. A hybrid electric motor vehicle drive charged by a turbine alternator comprising:

a) an electric motor driving a set of wheels through mechanical means for propulsion of said vehicle, b) a set of batteries divided into a plurality of series connected electric battery banks that are contained within said vehicle and connected to power said electric motor, c) a gas turbine operated by a gaseous fuel, d) an alternator that is driven by said gas turbine and that maintains said batteries in a charged condition, and e) a battery bank switchover control for selecting at least one battery bank to supply power ton said motor, and permitting all remaining battery banks to remain at rest.

* * * * *